UNITED STATES PATENT OFFICE 2,691,018

PROCESS OF CHLORINATING HYDROXY TRIAZINES WITH THIONYL CHLORIDE

Asa W. Joyce, Plainfield, and Wendell P. Munro, Martinsville, N. J., assignors to American Cyanamid Company, New York, N. Y., a corporation of Maine No Drawing. Application July 10, 1951, Serial No. 236,066

12 Claims. (Cl. 260—248)

This invention relates to an improved process of preparing ring chlorinated triazines by replacing the nuclear hydroxyl groups of hydroxy triazines with chlorine wherein the nuclearly hydroxylated triazine is reacted with thionyl chloride; as is fully hereinafter described and claimed.

Ring chlorinated triazines are important dyestuff intermediates, particularly for the preparation of anthraquinone vat dyes, by reaction with various aminoanthraquinone compounds. In the past, the chlorination has been effected with various chlorides of phosphorus, such as mixtures of phosphorus pentachloride and phosphorus oxychloride. The process operates to produce compounds of satisfactory purity, but they are obtained in admixture with non-volatile by-products, such as syrupy phosphoric acid, or lower chlorides thereof, which are reactive toward aminoanthraquinone compounds and must be separated out before reaction can be attempted. This involves an awkward isolation step by drowning the reaction mixture in water and separating the product. This adds to the cost of the process and also results in destroying any excess phosphorus chlorides which may be used, thus greatly adding to the cost.

According to the present invention, chlorination is effected with thionyl chloride in an inert organic solvent. Thionyl chloride has been generally believed to be incapable of replacing nuclear hydroxyl groups with chlorine although it has been known that hydroxyl groups of carboxylic acids could be replaced with chlorine by its use. In the process of the present invention, it has been found that the hydroxy triazines can be smoothly and efficiently transformed into chlorotriazines by means of the process of the present invention. There is no isolation problem because thionyl chloride is volatile and the by-products of its reaction, sulfur dioxide and hydrogen chloride, are gases; so that the chlorotriazines are obtained substantially pure. For many uses, such as the condensation with aminoanthraquinone compounds, it is not even necessary to isolate the chlorotriazine at all as this reaction proceeds readily and efficiently in the chlorination reaction mixture. The elimination of the isolation step is of great practical importance as it reduces the cost of producing the dyestuffs to a marked extent.

It is not known why thionyl chloride, which has been considered in the past unsuitable for use with nuclear hydroxyl groups reacts so smoothly and efficiently with hydroxy triazines. The reasons for this unexpected and anomalous behavior have not been determined and the invention is not limited to any theory of why the reaction proceeds so effectively with hydroxy compounds having a triazine ring.

A wide choice of organic solvents are suitable in carrying out the present invention, subject principally to the limitation of inertness under reaction conditions. Suitable solvents include, for example, aromatic and aliphatic hydrocarbons and their alkylated, halogenated and nitrated derivatives, such as nitrobenzene, chlorobenzene, xylene, tetrahydronaphthalene, alpha-chloronaphthalene, acetylene tetrachloride, ethylene dichloride and the like. Solvents having too low a boiling point should generally be avoided, as it will be seen that the reaction is best carried out between temperatures of 110 and 160° C.

The present procedure is applicable to a wide variety of hydroxylated triazines, including, for example, 3-hydroxy-5,6-diphenyl-1,2,4-triazine, cyanuric acid, 6-hydroxy-2,4-diphenyl-1,3,5-triazine, 6-hydroxy-2,4-di-p-tolyl-1,3,5-triazine, 3,5-dihydroxy-6-phenyl-1,2,4-triazine, 3,5-dihydroxy-6-methyl-1,2,4-triazine, and 3-hydroxy-5,6-bis-(p-anisyl)-1,2,4-triazine. Excellent results, in particular, are given by 2 alkyl or aryl substituted 4,6-dihydroxy-1,3,5-triazines, which are also known as guanamides, and these constitute a preferred embodiment of the present invention, including, for example, acetoguanamide, benzoguanamide, o-methoxy-benzoguanamide, o-ethoxybenzoguanamide, 2-methoxy-5-chlorobenzoguanamide, 2-methoxy-5-methyl-benzoguanamide, 2-methoxy-3-naphthoguanamide, 2,4-dimethoxybenzoguanamide and o-methylbenzoguanamide.

While the present invention may be used with thionyl chloride alone and represents a marked increase in efficiency over the processes used in the past in which chlorides of phosphorus were the chlorinating agents, we have found that the reaction can be greatly accelerated with catalytic amounts of phosphorus pentachloride. The amounts are so small, for optimum results, amounting to from .05 to .1 mol per mol of hydroxy triazine, that they do not contribute any significant degree of chlorination and appear to act entirely catalytically. Amounts even less than .05 mol still exert an accelerating effect although below this figure the degree of acceleration of the reaction begins to fall off. It is not known why these minute amounts of phosphorus pentachloride exert their catalytic effect nor is the mechanism by which they operate known at present.

It is an advantage of the present invention that the reaction conditions are not critical and there is no problem involved by special reagents such as is often the case with phosphorus chloride chlorinations where foaming and other difficulties often reduce the effectiveness of the reaction. The thionyl chloride in the organic solvent presents no extraordinarily serious corrosion problem and can be readily handled. It is usually desirable, although not essential, to use a reasonable excess of thionyl chloride as it helps to drive the reaction to completion. The excess does not represent any loss as in the case of excess chlorides of phosphorus in the old processes because it can easily be removed by distillation and reused. This constitutes one of the important economic advantages of the process of the present invention.

Another advantageous feature of the process of the present invention is that it is possible to follow the progress of the reaction by noting the gradual formation of a clear solution in the organic solvent as the starting material is converted into a more soluble product. Further, if the reaction is carried out under reflux which is desirable for practical temperature control, the temperature will gradually rise as the volatile thionyl chloride is consumed in the reaction and this change of temperature constitutes a very simple and reliable means of following the progress of the reaction. Both of these control factors render the process of the present invention simple to operate with a minimum of skilled supervision. When the reaction is complete, particularly when it is operated under reflux as in the preferred modification, any excess thionyl chloride and excess solvent can be removed readily by vacuum distillation. Isolation of the product from the remaining solution is simple and presents no operating problem or hazard. The yields and quality of product are excellent.

The freedom from deleterious non-volatile by-products which characterizes the process of the present invention also makes possible a further operating saving because the reaction mixture containing the chlorinated triazine can be condensed with aminoanthraquinone compounds in situ without any isolation. In a more specific aspect, therefore, the present invention includes this combined process.

The invention will be described in greater detail by the following specific examples, all parts being by weight unless otherwise specified. As some of the intermediates are themselves new chemical compounds, their production is shown in separate examples.

EXAMPLE 1

*o-Methoxybenzoyldicyandiamide*

A slurry of 120 parts of acetone and 21 parts of dicyandiamide is cooled to 5-10° C. and treated with 26.4 parts of potassium hydroxide. After 1 hour's stirring at 0-5° C., the mixture is cooled below 0° C. and there is slowly added to it a solution of 34.1 parts o-methoxybenzoyl chloride in 120 parts of acetone. Stirring is then continued until the reaction mixture comes to room temperature. It is diluted to approximately the volume of 1000 parts of water and slowly acidified with approximately 14 parts of acetic acid. The resulting product is stirred thoroughly, filtered, washed, and air dried. It melts approximately at 186° C.

EXAMPLE 2

*o-Methoxybenzoylbiuret*

A mixture of 80 parts of o-methoxybenzoyldicyandiamide, prepared as described in Example 1, 400 parts of water and 67 parts of concentrated hydrochloric acid is gradually heated to reflux with stirring, and refluxed 3 hours. The slurry is then cooled to 0-5° C. and filtered. The product is washed with very dilute hydrochloric acid and air dried. It melts approximately at 185° C.

EXAMPLE 3

*o-Methoxybenzoguanamide*

54.3 parts of o-methoxybenzoylbiuret, prepared as in Example 2, is dissolved in a solution of 30.2 parts potassium hydroxide in 600 parts of water and stirred at room temperature for 15 hours. The product is precipitated by careful acidification with approximately 21 parts of acetic acid, and then cooled and filtered. It melts approximately at 250° C.

EXAMPLE 4

*o-Methoxyphenyl dichlorotriazine*

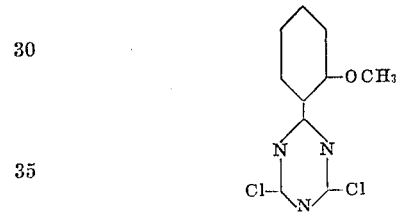

A mixture of 43.8 parts of o-methoxybenzoguanamide, as prepared in Example 3, 720 parts of dichlorobenzene, 120 parts of thionyl chloride and 4 parts of phosphorus pentachloride is thoroughly agitated and heated to reflux. As the reaction proceeds, the o-methoxybenzoguanamide dissolves completely and the reflux temperature gradually increases from about 110° C. to about 150° C. The reaction is completed at the latter temperature and the excess thionyl chloride and solvent removed by distillation under vacuum. An excellent yield of product is obtained, which may be recrystallized from methylcyclohexane.

EXAMPLE 5

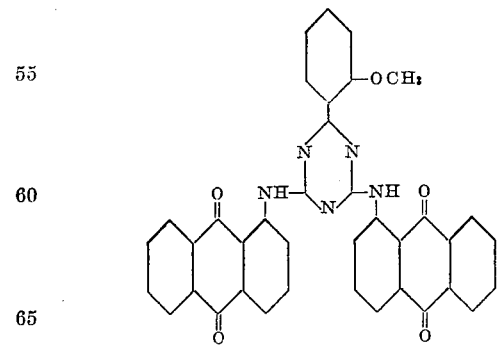

o-Methoxybenzoguanamide may be converted to the corresponding dichlorotriazine and reacted in situ with 1-aminoanthraquinone by the following procedure.

A mixture of 11.0 parts of o-methoxybenzoguanamide, 120 parts of o-dichlorobenzene and 30 parts of thionyl chloride is stirred and heated to reflux. The o-methoxybenzoguanamide gradually goes into solution during the reflux period and the temperature rises from about 120° C. to about 150° C. When the reaction is complete at the latter temperature, excess thionyl chloride is removed in vacuo at 80° to 100° C. To the resulting solution is added 22.4 parts of 1-aminoanthraquinone. The condensation is carried out at 130–140° C., the resulting yellow vat dye then being isolated in excellent yield by filtration.

EXAMPLE 6

The product of Example 5 may also be prepared by stirring and heating to reflux a mixture of 11.0 parts of o-methoxybenzoguanamide, 120 parts of nitrobenzene and 40 parts of thionyl chloride. As the reaction proceeds, the reflux temperature gradually rises to about 148° C. and a clear solution of the dichlorotriazine is obtained. Residual thionyl chloride is removed by distillation at 100–120° C. under partial vacuum. The solution is cooled to 50° C., and there is added an additional 60 parts of nitrobenzene followed by 22.4 parts of 1-aminoanthraquinone. The condensation is carried out at 135–140° C., giving a slurry of yellow dye, which is cooled and filtered. The yield is excellent.

EXAMPLE 7 o-Methylbenzoyldicyandiamide

To a mixture of 158 parts of dicyandiamide, 745 parts of acetone, and 9.5 parts of water at 3° C., there is added 147 parts of potassium hydroxide flakes. This is stirred thoroughly at a temperature of 5° C., and there is added a solution of 144.7 parts of o-toluyl chloride in 160 parts of acetone. The reaction is completed by stirring at 5° C., after which the reaction mixture is drowned in 3,000 parts of water and 2,000 parts of ice containing 110 parts of 75% sulfuric acid. The mixture is stirred thoroughly and filtered. The yield of product is excellent. It may be purified by slurrying in 25% aqueous acetone and filtering. It melts at approximately 200° C.

EXAMPLE 8 o-Methylbenzoylbiuret

A mixture of 960 parts of water, 50 parts of 100% sulfuric acid and 80 parts of the above prepared o-methylbenzoyldicyandiamide is heated to reflux over a period of 1 hour and refluxed for 4 hours. The reaction product is then cooled to room temperature and filtered. The product is washed free of acid and dried. The yield is excellent. It melts at approximately 222° C.

EXAMPLE 9 o-Methylbenzoguanamide

To a solution of 66 parts of potassium hydroxide in 1200 parts of water at 40° C., there is added 84.5 parts of the above prepared o-methylbenzoylbiuret. The mixture is heated to 50° C. with stirring and allowed to stand overnight at room temperature. The solution is then clarified by filtration and the product precipitated by careful acidification with hydrochloric acid, excess acid being avoided. The product is filtered, washed and dried. It is obtained in excellent yield. It may be recrystallized, if desired, from glacial acetic acid and melts at approximately 295° C.

EXAMPLE 10 o-Tolyl dichlorotriazine

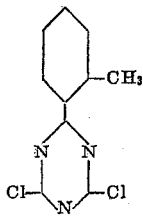

A mixture of 10.2 parts of o-methylbenzoguanamide, 30.0 parts of thionyl chloride and 5.3 parts of phosphorus pentachloride in 225 parts of o-dichlorobenzene is well stirred and heated to reflux. The reflux temperature gradually rises to about 158° C. and a clear pale amber solution of the dichlorotriazine is obtained. Solvent and excess thionyl chloride are removed by distillation in vacuo. The product is obtained in crystalline form and may be recrystallized from heptane.

EXAMPLE 11

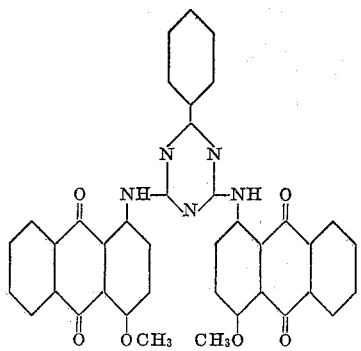

A mixture of 11.3 parts of benzoguanamide, 125 parts of nitrobenzene, and 40 parts of thionyl chloride is heated to gentle reflux. The temperature gradually rises from 110° C. to 150° C., and a clear solution of phenyldichlorotriazine is obtained. After removal of excess thionyl chloride by distillation under partial vacuum, 25.3 parts of 4-methoxy-1-aminoanthraquinone is added. The condensation is completed at 105–110° C., and the resulting orange-red dye is cooled and filtered.

EXAMPLE 12

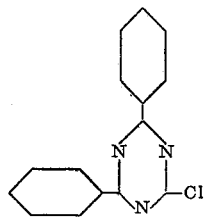

A mixture of 12.5 parts of 2-hydroxyl-4,6-diphenyl-1,3,5-triazine, 30.0 parts of thionyl chloride and 1.0 part of phosphorus pentachloride in 120 parts of o-dichlorobenzene is heated to gentle reflux, while the temperature gradually rises from 115° to about 140° C. Solvent and excess thionyl chloride are removed by distillation in vacuo at 80–100° C., and the residual 2 - chloro - 4,6 - diphenyl - triazine washed with methanol. An excellent yield is obtained.

EXAMPLE 13

The dyestuff of Example 5 may also be prepared by the following procedure. A mixture of 10.8 parts of o-methoxybenzoguanamide, 40 parts of thionyl chloride and 120 parts of trichlorobenzene (mixed isomers) is stirred under reflux until the o-methoxybenzoguanamide is completely dissolved, while the temperature gradually rises to about 160° C. Excess thionyl chloride is then removed by distillation under reduced pressure. After cooling to 50° C., 22.4 parts of 1-aminoanthraquinone is added and the condensation carried out at 130–140° C. The yellow vat dye which separates is isolated in excellent yield by filtration at room temperature.

We claim:

1. As an improved method of preparing a triazine vat dye having the formula

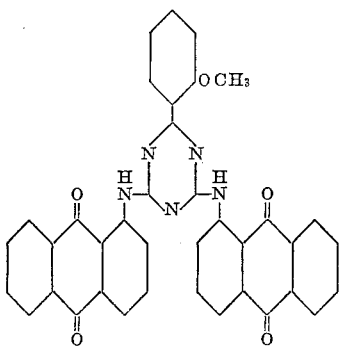

from o-methoxybenzoguanamide, the new method which comprises reacting said guanamide with thionyl chloride in an inert organic solvent to replace the nuclear hydroxy groups thereof with chlorine and to convert said guanamide into the corresponding 4,6-dichloro-1,3,5-triazine compound, removing the volatile by-products of said reaction and the excess thionyl chloride by distillation, adding 1-aminoanthraquinone to the solution of said dichlorotriazine so obtained, condensing said aminoanthraquinone with said dichlorotriazine in situ therein to produce said triazine dye and recovering the triazine dye from the reaction mixture.

2. The process of claim 1 wherein the reaction of the o-methoxy-benzoguanamide with the thionyl chloride in said solvent is effected at temperatures between 110° and 160° by heating the reaction mixture under reflux until the said guanamide is converted into the corresponding 4,6-dichloro-1,3,5-triazine compound, the volatile by-products of said reaction being simultaneously removed during said heating.

3. As an improved method of preparing a triazine vat dye having the formula

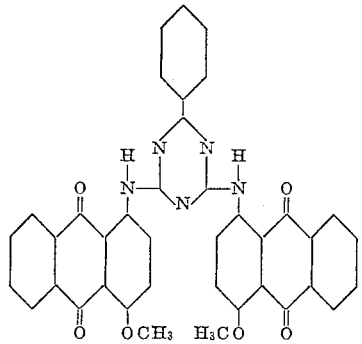

from benzoguanamide, the new method which comprises heating the benzoguanamide with an excess of thionyl chloride in nitrobenzene under reflux until the hydroxy groups thereof are replaced with chlorine and the said guanamide is converted into 2-phenyl-4,6-dichloro-1,3,5-triazine, removing the excess thionyl chloride by distillation under reduced pressure, adding 1-amino-4-methoxy-anthraquinone to the solution of the dichlorotriazine so obtained, condensing said amino-anthraquinone with the said dichlorotriazine, in situ, therein to produce said triazine dye and recovering said triazine dye from the reaction mixture.

4. As an improved method of preparing triazine vat dyes having the formula

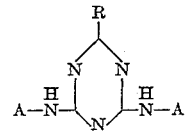

wherein R is a hydrocarbon group and A represents an alpha-anthraquinonyl radical, from a guanamide having the following formula

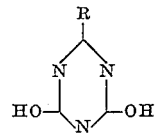

wherein R is a hydrocarbon group, the new method which comprises reacting said guanamide with thionyl chloride in an inert organic solvent to replace the hydroxy groups thereof with chlorine and to convert said guanamide into the corresponding 4,6-dichloro-1,3,5-triazine compound, removing the volatile by-products and excess thionyl chloride by distillation, adding an alpha-aminoanthraquinone compound to the solution of said dichlorotriazine so obtained, condensing said aminoanthraquinone compound with said dichlorotriazine in situ therein, to produce said triazine dye and recovering the triazine dye from the reaction mixture.

5. The process of claim 4 in which the said guanamide is a 2-alkyl-4,6-dihydroxy-1,3,5-triazine.

6. The process of claim 5 in which said 2-alkyl-4,6-dihydroxy-1,3,5-triazine is acetoguanamide.

7. As an improvement in preparing nuclearly substituted 1,3,5-triazines from nuclearly hydroxylated triazines having the formula

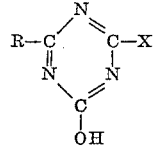

wherein R represents a hydrocarbon group and X represents a substituent selected from the class consisting of hydroxy and hydrocarbon groups, the improvement which comprises heating said hydroxy triazines with an excess of thionyl chloride in an inert organic solvent under reflux to temperatures between 110° and 160° C. to replace the hydroxy groups thereof with chlorine and convert said hydroxytriazine into a nuclearly chlorinated triazine and to simultaneously remove the volatile by-products of said reaction, and further heating the reaction mixture under reduced pressure to remove the excess thionyl chloride.

8. The process of claim 7 in which said hydroxy triazine is o-methoxy-benzoguanamide.

9. The process of claim 7 in which said hydroxy triazine is o-methyl-benzoguanamide.

10. The process of claim 7 in which said hydroxytriazine is benzoguanamide.

11. As a new method of preparing nuclearly chlorinated triazine compounds having the formula

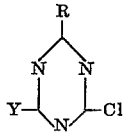

wherein R is a hydrocarbon group and Y represents a substituent selected from the class consisting of a hydrocarbon group and chlorine, from nuclearly hydroxylated triazine compounds having the formula

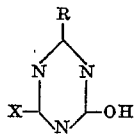

wherein R is a hydrocarbon group and X represents a substituent selected from the class consisting of hydroxyl and hydrocarbon groups, the improved method which comprises reacting said hydroxy triazine in an inert organic solvent with thionyl chloride in the presence of a catalytic amount of phosphorus pentachloride to replace the hydroxyl groups thereof with chlorine and to convert said hydroxy triazine into a nuclearly chlorinated triazine compound.

12. The process of claim 11 wherein the said reaction is effected by heating the reaction mixture under reflux at temperatures between 110° C. and 160° C. the gaseous by-products of the reaction being simultaneously removed during said heating.

References Cited in the file of this patent

UNITED STATES PATENTS

| Number | Name | Date |
| --- | --- | --- |
| 1,867,125 | Weiners | July 12, 1932 |
| 1,897,428 | Heintrich | Feb. 14, 1933 |
| 1,904,229 | Heintrich | Apr. 18, 1933 |
| 2,361,823 | D'Alelio | Oct. 31, 1944 |
| 2,489,354 | Wolf | Nov. 29, 1949 |
| 2,489,358 | Wolf | Nov. 29, 1949 |

FOREIGN PATENTS

| Number | Country | Date |
| --- | --- | --- |
| 449,477 | Great Britain | 1936 |
| 796,539 | France | 1936 |

OTHER REFERENCES

Groggins: "Unit Processes in Organic Synthesis," 3rd Ed., page 219 (1947).